(12) United States Patent
Yoshizumi et al.

(10) Patent No.: US 6,710,883 B2
(45) Date of Patent: Mar. 23, 2004

(54) APPARATUS AND METHOD FOR MEASURING FLATNESS OF THIN PLATE

(75) Inventors: Keiichi Yoshizumi, Higashiosaka (JP); Keishi Kubo, Moriguchi (JP); Hiroyuki Takeuchi, Hirakata (JP); Kouji Handa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 127 days.

(21) Appl. No.: 10/140,883

(22) Filed: May 9, 2002

(65) Prior Publication Data

US 2002/0167674 A1 Nov. 14, 2002

(30) Foreign Application Priority Data

May 14, 2001 (JP) ........................................ 2001-143282

(51) Int. Cl.[7] .............................. G01B 9/02; G01B 11/02
(52) U.S. Cl. ...................... 356/492; 356/493; 356/495; 356/500; 356/516
(58) Field of Search ................................ 356/492, 493, 356/495, 500, 516

(56) References Cited

U.S. PATENT DOCUMENTS

| 4,353,650 A | * | 10/1982 | Sommargren |
| 4,611,916 A | * | 9/1986 | Yoshizumi |
| 4,776,699 A | * | 10/1988 | Yoshizumi |
| 5,325,175 A | * | 6/1994 | Mocker et al. |
| 5,563,706 A | * | 10/1996 | Shibuya et al. |
| 5,600,441 A | * | 2/1997 | de Groot et al. |
| 5,973,781 A | * | 10/1999 | Moeller et al. |
| 5,995,223 A | * | 11/1999 | Power |
| 6,552,804 B2 | * | 4/2003 | Hill |

FOREIGN PATENT DOCUMENTS

JP        2000-28372        1/2000

* cited by examiner

Primary Examiner—Frank G. Font
Assistant Examiner—Khaled Brown
(74) Attorney, Agent, or Firm—Wenderoth, Lind & Ponack, L.L.P.

(57) ABSTRACT

The invention measures a thickness variation at a high accuracy around a wide range of a thin plate by a comparatively large spot diameter between 0.5 mm and 2 mm. A polarization beam splitter separating a laser beam emitted from a laser generator and transmitting through an isolator into a measurement light and a reference light is provided. A quarter wavelength plate is provided between the polarization beam splitter and a measurement surface, and between the polarization beam splitter and a reference surface. A focusing and reflecting means for focusing and reflecting the measurement light reflected by the measurement surface and reflected by the polarization beam splitter, and the reference light reflecting by the reference surface and transmitting through the polarization beam splitter is provided. A half mirror reflecting the measurement light and the reference light which return from the polarization beam splitter is provided. A light receiving portion receiving the measurement light and the reference light which are reflected by the half mirror so as to interfere, converting an interference light intensity change into an electric signal, and counting the electric signal so as to measure a flatness of the measurement surface is provided.

7 Claims, 6 Drawing Sheets

APPARATUS AND METHOD FOR MEASURING FLATNESS OF THIN PLATE

BACKGROUND OF THE INVENTION

The present invention relates to an apparatus and a method for measuring a flatness of a thin plate, which measures a flatness of surface or a thickness variation of a thin plate such as a wafer for manufacturing a semiconductor, a magnetic recording disc or the like.

The wafer for manufacturing the semiconductor is constituted by a thin plate such as a silicone or the like. In order to form a semiconductor device or a circuit on a wafer surface, there is executed a working process to which a photo engraving technique, a printing technique, various kinds of micro-fabrication techniques or the like is applied. In the wafer to which such working process is applied, it is important to increase a flatness of a surface. When the flatness of the wafer is deteriorated, a pattern of the device or the circuit is unclearly formed, or a profile of a material to be printed on the wafer surface in a pattern shape becomes indefinite, at a time of photo engraving. In particular, as a densification or a large-size of the semiconductor device or the circuit is promoted, the problem mentioned above becomes remarkable.

In a semiconductor manufacturing step, various kinds of processes are frequently executed in a state in which a whole surface of the wafer is supported in a closely contact manner to a flat supporting surface by a means such as a vacuum adsorption or the like. At this time, in the case that a flatness or a thickness of the wafer has a dispersion, the dispersion of the thickness appears as a dispersion of the flatness of the wafer surface as it is at a time of supporting the wafer to the flat supporting surface in a closely contact manner. Accordingly, it is required that the dispersion is not generated in the flatness or the thickness of the wafer. In order to estimate whether or not the thickness variation of the manufactured wafer is large in the manufacturing step of the wafer or the like, it is necessary to accurately and efficiently measure the flatness and the thickness variation of the wafer.

As a conventional wafer thickness variation measuring apparatus, there is a structure described in Japanese Patent Application Laid-Open No. 2000-28372. In this measuring apparatus, a displacement of the wafer surface is measured by optical probes arranged in side portions of both surfaces of the wafer while rotating a disc-like wafer in a perpendicularly standing state, whereby a magnitude of the thickness variation of the wafer is calculated on the basis of this displacement. By scanning the optical probes in a radial direction of the wafer, it is possible to measure the thickness variation with respect to the whole surface of the wafer.

The optical probe used in the measuring apparatus disclosed in Japanese Patent Application Laid-Open No. 2000-28372 is structured such that a spot diameter of a laser beam focused by the lens is about 0.1 mm, and has an advantage that a spatial resolving capacity for measurement is high. This is an excellent probe which can measured a fine external waviness on the wafer. However, since the spot diameter is small, it is hard to measure a whole surface of the wafer all over. When it is intended to scan the whole surface of the wafer having a diameter 300 mm all over by the spot diameter of 0.1 mm, it is necessary to set a measurement pitch to be equal to or less than 0.1 mm and rotate at 1500 times at the minimum, in view of computation. On the contrary, when the spot diameter is set to 1 mm, it is possible to scan the whole surface of the wafer only at 150 rotations, however, the spatial resolving capacity is reduced.

SUMMARY OF THE INVENTION

An object of the present invention is to provide an apparatus and a method for measuring a flatness of a thin plate which can measure a flatness at a high accuracy around a wide range of the thin plate by a comparatively large spot diameter between 0.5 mm and 2 mm.

In order to achieve the object mentioned above, in accordance with the present invention, there is provided an optical probe measuring apparatus, said apparatus having an optical probe comprising:

a polarization beam splitter separating a laser beam emitted from a laser generator and transmitting through an isolator into a measurement light and a reference light, irradiating the measurement light to a measurement surface of a thin plate and irradiating the reference light to a reference surface arranged perpendicular to the measurement surface;

a quarter wavelength plate arranged between the polarization beam splitter and the measurement surface and through which the measurement light transmits;

a quarter wavelength plate arranged between the polarization beam splitter and the reference surface and through which the reference light transmits;

a focusing and reflecting means for focusing and reflecting the measurement light reflecting by the measurement surface and reflecting by the polarization beam splitter, and the reference light reflecting by the reference surface and transmitting through the polarization beam splitter;

a half mirror reflecting the measurement light and the reference light which return from the polarization beam splitter; and a light receiving portion receiving the measurement light and the reference light which are reflected by the half mirror so as to interfere, converting an interference light intensity change into an electric signal, and counting the electric signal so as to measure a flatness of the measurement surface.

In the optical probe measuring apparatus mentioned above, the laser beam which is not focused by the lens has a spot diameter of about 1 mm, and the laser beam is separated into the measurement light and the reference light by the polarization beam splitter so as to be irradiated to the measurement surface and the reference surface, respectively. The respective reflection lights are again irradiated to the measurement surface and the reference surface, and are reflected. These reflection lights of the measurement light and the reference light return to an emitting light path of the laser beam, and are injected to the light receiving portion. In this case, since the measurement light and the reference light are interfered on the basis of a light path difference between the measurement light and the reference light due to a distortion or an unevenness existing on the measurement surface, the flatness of the measurement surface can be measured. When irradiating the measurement light to the measurement surface, the reflection light reflects in a different direction from that of the incident light path due to an incline change of the measurement surface, however, since this is again irradiated to the measurement surface, the reflection light returns to the same direction as that of the initial incoming light. Accordingly, it is possible to interfere the reflection light with the reference light even when the measurement surface is in some degree inclined.

It is preferable that the focusing and reflecting means is constituted by a focusing lens focusing the measurement light and the reference light and a mirror arranged at the focusing position. Otherwise, the focusing and reflecting means can be constituted as a corner cube prism reflecting the measurement light and the reference light.

It is possible to obtain a spot diameter of 0.5 to 2 mm by arranging a beam expander in the emitting light path of the laser generator.

It is preferable that the optical probe is arranged in both sides of the thin plate in an opposing manner, and a measuring means for adding the measurement data concerning the flatness so as to measure a thickness variation of the thin plate is provided.

In order to achieve the object mentioned above, in accordance with the present invention, there is provided an optical probe measuring method comprising:

separating a laser beam into a measurement light and a reference light by a polarization beam splitter;

irradiating the measurement light to a measurement surface of a thin plate via a quarter wavelength plate;

irradiating the reference light to a reference surface arranged perpendicular to the measurement surface via a quarter wavelength plate;

focusing and reflecting the measurement light reflecting by the measurement surface, transmitting through the quarter wavelength plate and reflecting by the polarization beam splitter, and the reference light reflecting by the reference surface, transmitting through the quarter wavelength plate and transmitting through the polarization beam splitter;

again separating the measurement light and the reference light which focus and reflect, by the polarization beam splitter, and irradiating the measurement light and the reference light respectively on the measurement surface and the reference surface via the quarter wavelength plates;

reflecting the measurement light which again reflects by the measurement surface, transmits through the quarter wavelength plate and transmits through the polarization beam splitter, and the reference light which again reflects by the reference surface, transmits through the quarter wavelength plate and reflects by the polarization beam splitter, by a half mirror; and receiving the measurement light and the reference light which are reflected by the half mirror so as to interfere, converting an interference light intensity change into an electric signal, and counting the electric signal so as to measure a flatness of the measurement surface.

It is preferable to execute the optical probe measuring method in both sides of the thin plate, and add these measurement data so as to measure the thickness variation of the thin plate.

DETAILED DESCRIPTION OF THE PREFERRED EMBODIMENTS

A description will be given below of an embodiment in accordance with the present invention with reference to the accompanying drawings.

Figure 1:
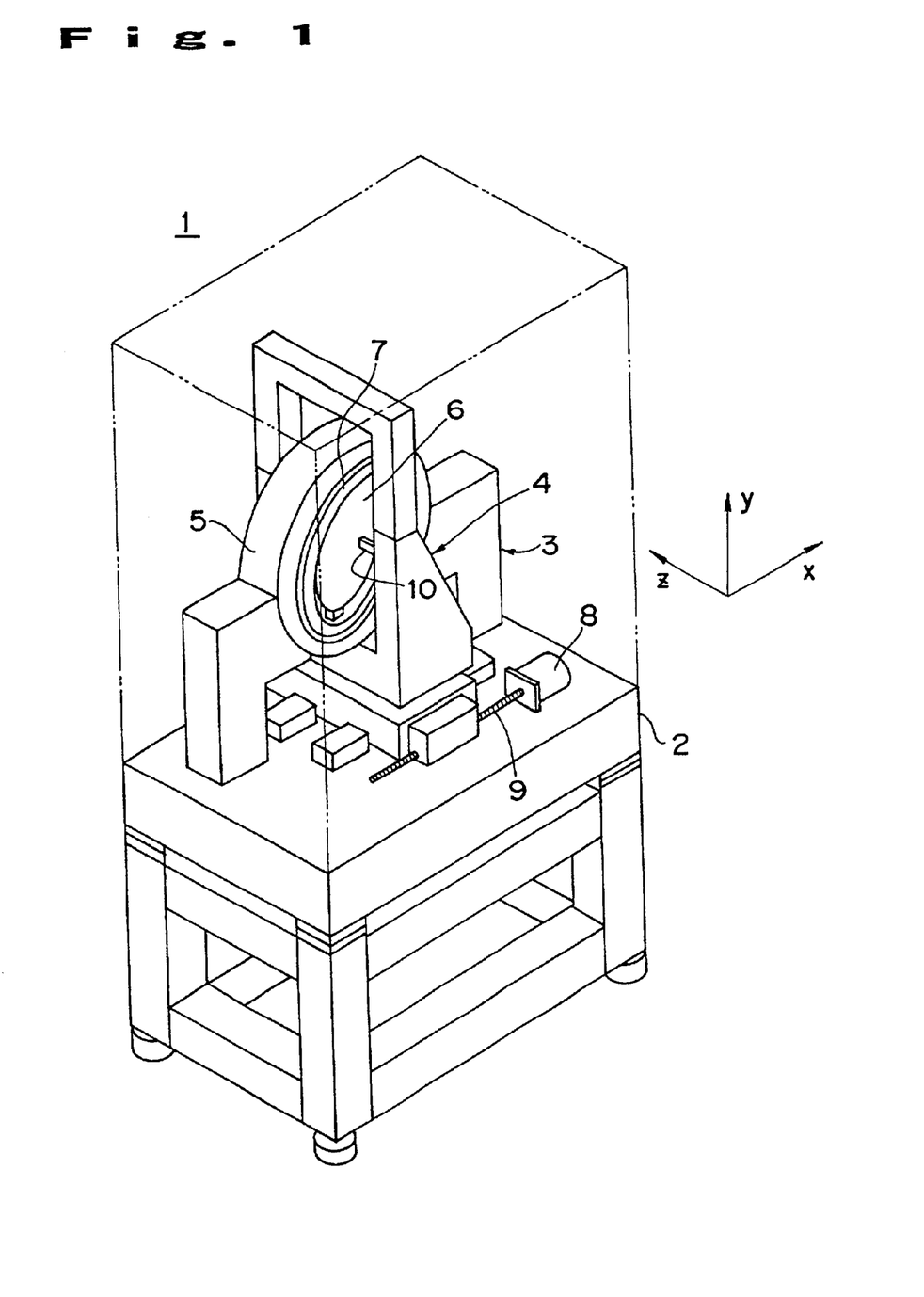
FIG. 1 is a perspective view of an apparatus for measuring a flatness of a semiconductor wafer, the apparatus being provided with an optical probe measuring apparatus in accordance with the present invention.

FIG. 1 shows a flatness measuring apparatus 1 for a semiconductor wafer made of a silicon or the like. The apparatus 1 is provided with a wafer holding block 3 and a sensor moving block 4 on a table 2. The wafer holding block 3 is constituted by a direct drive motor 5 and an annular spindle 7 rotated within an XY-axes surface by the direct drive motor 5 and holding a wafer 6 in an inner periphery. The sensor moving block 4 can move in an X-axis direction along a guide via a ball screw 9 rotated by a motor 8, and is provided with an optical probe 10 detecting a flatness of a surface of the wafer 6 mounted to the spindle 7 in both surfaces (only one surface is illustrated) of the wafer 6.

Figure 2:
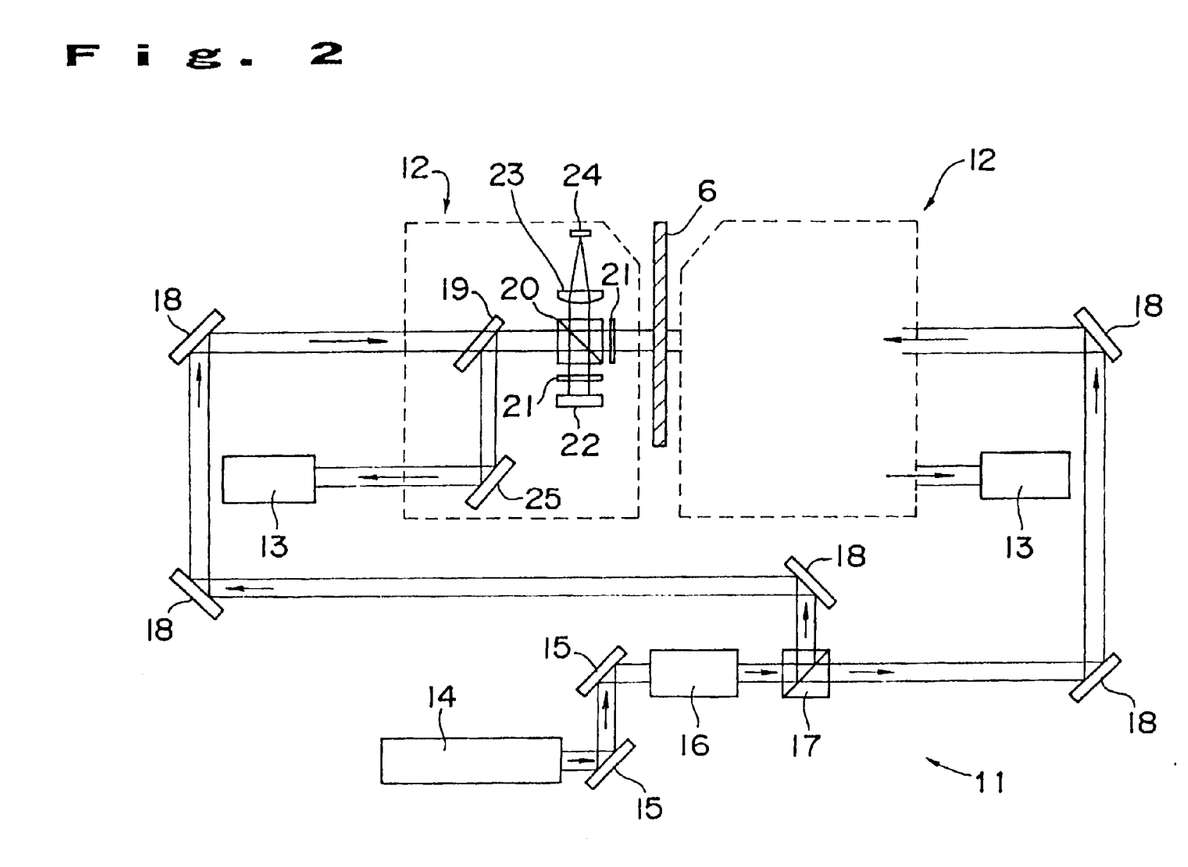
FIG. 2 is a view showing an example of an optical system of the optical probe.

The optical probe 10 is substantially constituted by one laser output system 11, two measurement optical systems 12 and two light receiving portions 13, as shown in FIG. 2.

The laser output system 11 is constituted by a laser generator 14, a plurality of mirrors 15, an isolator 16, a beam splitter 17 and a plurality of mirrors 18.

The measurement optical system 12 is constituted by: a half mirror 19, a polarization beam splitter 20 and a quarter wavelength plate 21 which are arranged on a probe shaft perpendicular to the surface of the wafer 6 and receive a light from the laser output system 11; a quarter wavelength plate 21 and a reference mirror 22 which are arranged in one direction passing through a center of the polarization beam splitter 20 and perpendicular to the probe shaft; a lens 23 and a mirror 24 which are arranged in another direction passing through the center of the polarization beam splitter 20 and perpendicular to the probe shaft; and a mirror 25 introducing the light reflected by the half mirror 19 to the light receiving portion 13.

The light receiving portion 13 is structured such as to receive the measurement light and the reference light from the measurement optical system so as to determined the flatness of the wafer, and is constituted by an electronic circuit and a microcomputer.

Next, a description will be given of an operation of the optical probe 10 structured in the manner mentioned above.

A frequency stabilizing He-Ne laser emitted from the laser generator 14 transmits through the isolator 16 via a plurality of mirrors 15 so as to form a linear polarization having an oblique 45 degrees, is separated into two directions by the beam splitter 17, and is supplied to two measurement optical systems 12 via a plurality of mirrors 18.

Figure 3:
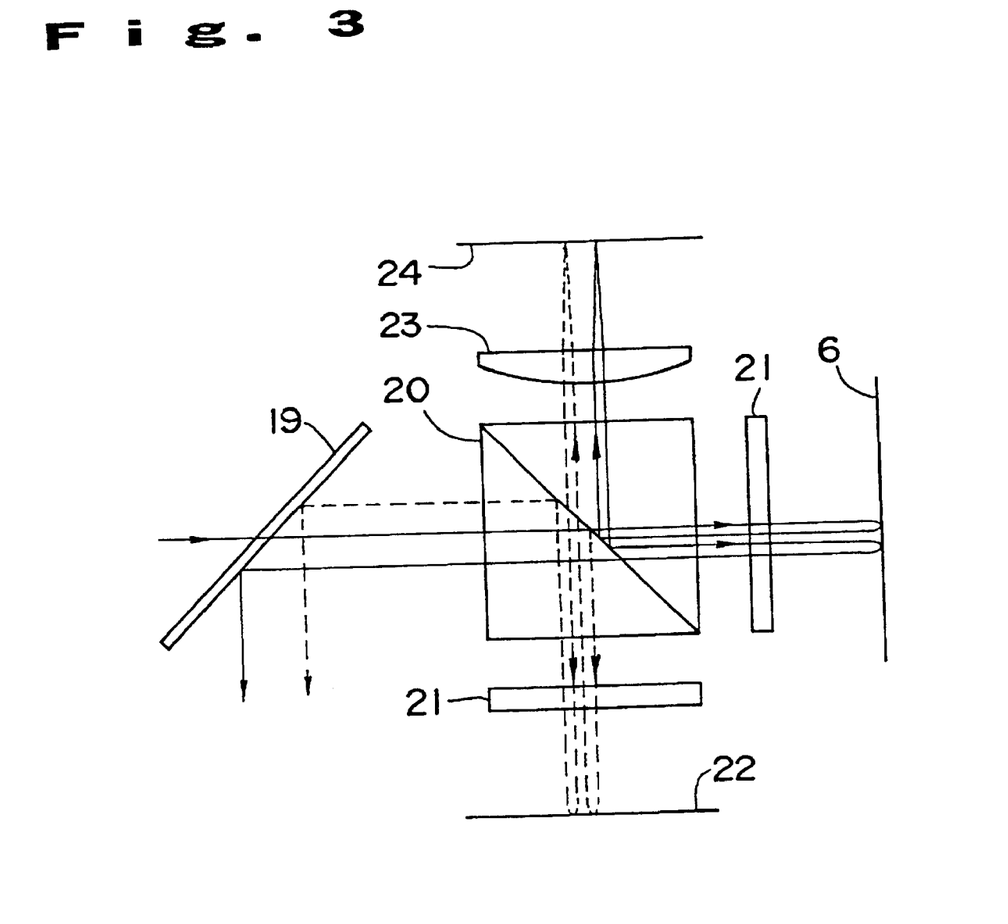
FIG. 3 is a view showing light paths of a measurement light and a reference light.

In each measurement optical system 12, as shown in FIG. 3, a linear polarization light from the laser output system 11 is supplied to the polarization beam splitter 20 after transmitting through the half mirror 19. Among the lights supplied to the polarization beam splitter 20, a component (vertical component) in which a vibrating direction of electric field in the light is parallel to the paper surface of the drawing, transmits through the polarization beam splitter 20 as shown by a solid line in FIG. 3, and transmits through the quarter wavelength plate 21 so as to be irradiated to the surface of the wafer 6 as the measurement light. Since the measurement light reflected from the wafer 6 again transmits through the quarter wavelength plate 21 and changes to a light in which the vibrating direction of the electric field in the light is perpendicular to the paper surface of the drawing, the measurement light reflects on the polarization beam splitter 20. The light reflecting on the polarization beam splitter 20 is focused by the lens 23 so as to reflect on the mirror 24, again reflects on the polarization beam splitter 20, and transmits through the quarter wavelength plate 21 so as to be irradiated to the surface of the wafer 6. Since the measurement light again reflecting from the wafer 6 transmits through the quarter wavelength plate 21, and changes to a light in which the vibrating direction of the electric field in the light is parallel to the paper surface of the drawing, the measurement light transmits through the polarization beam splitter 20 and returns to the half mirror 19.

On the contrary, among the lights supplied to the polarization beam splitter 20, a component (horizontal component) in which the vibrating direction of the electric field in the light is vertical to the paper surface of the drawing, reflects on the polarization beam splitter 20 as shown by a broken line in FIG. 3, transmits through the quarter wavelength plate 21 as the reference light, and reaches the reference mirror 22. Since the reference light reflecting on the reference mirror 22 again transmits through the quarter wavelength plate 21 and changes to a light in which the vibrating direction of the electric field in the light is parallel to the paper surface of the drawing, the reference light transmits through the polarization beam splitter 20. The light transmitting through the polarization beam splitter 20 is focused by the lens 23 so as to reflect on the mirror 24, again transmits through the polarization beam splitter 20, transmits through the quarter wavelength plate 21, and again reaches the reference mirror 22. Since the reference light again reflecting on the reference mirror 22 transmits through the quarter wavelength plate 21, and changes to a light in which the vibrating direction of the electric field in the light is perpendicular to the paper surface of the drawing, the reference light reflects on the polarization beam splitter 20 and returns to the half mirror 19.

The measurement light and the reference light returning to the half mirror 19 do not return to the laser generator 14 due to an effect of the isolator 16 although a part thereof transmits through the half mirror 21 so as to return to the laser output system 11, whereby no return optical noise is generated. The measurement light and the reference light reflecting on the half mirror 19 are supplied to the light receiving portion 13 via the mirror 25.

In the light receiving portion 13, the measurement light and the reference light are interfered. That is, since a distance between the polarization beam splitter 20 and the reference mirror 22 does not change in the reference light, however, a distance between the polarization beam splitter 20 and the surface of the wafer 6 changes in accordance with the unevenness of the wafer in the measurement light, an interference signal between the measurement light and the reference light is generated in correspondence to the distance change. The flatness of the wafer 6 is measured by converting the interference signal into the electric signal and counting it. Further, the thickness variation of the wafer is measured by adding the measurement data of the flatness given by the right and left measurement optical systems 12.

Figure 4:
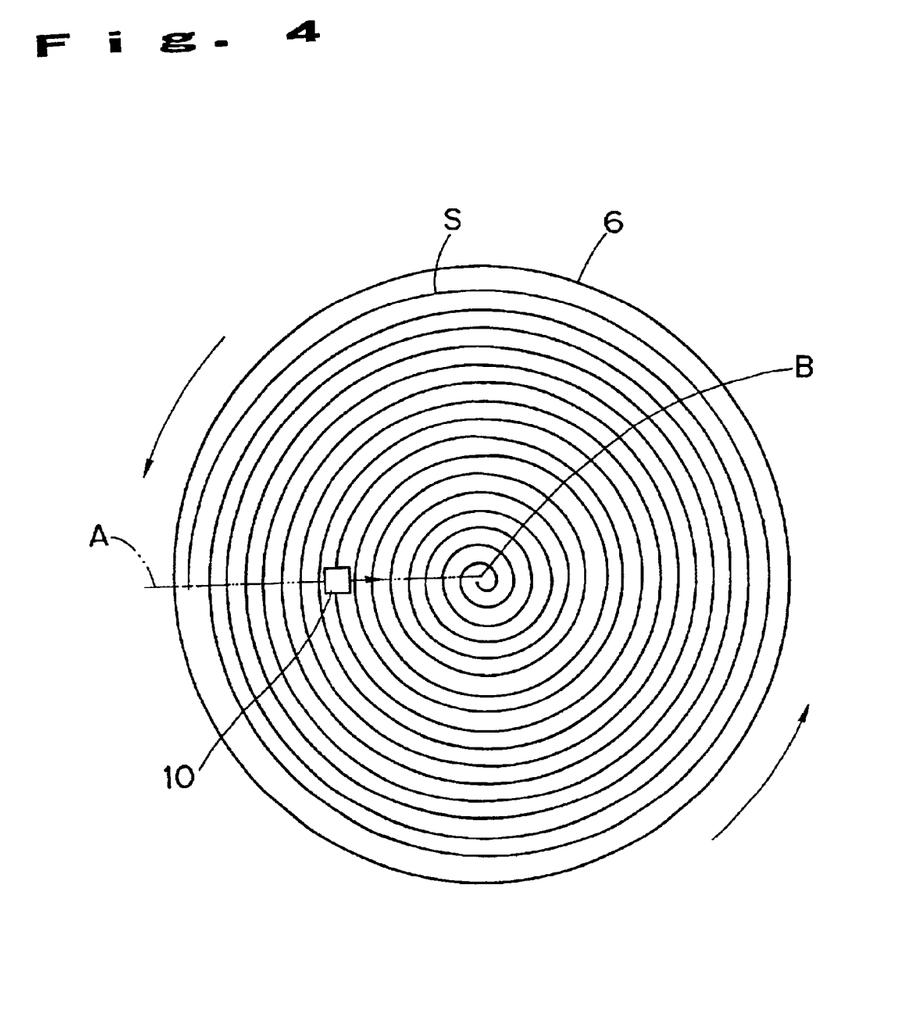
FIG. 4 is a front elevational view showing a locus of the optical probe with respect to the wafer.

In the measurement by the optical probe 10, as shown in FIG. 4, the wafer 6 is rotated in one direction in vertical dimension, and the optical probe 10 is moved in a radial direction from an outer periphery A of the wafer 6 toward a center B. Accordingly, a position of the optical probe 10 moves along a spiral line shown by a locus S, with respect to the wafer 6. It is possible to efficiently execute the measurement of the flatness with respect to the whole surface of the wafer 6 by suitably expanding the interval of the locus S. Further, since it is sufficient to linearly move the optical probe 10 in a horizontal direction only at a distance AB, a moving mechanism of the optical probe 10 becomes simple.

Figure 5:
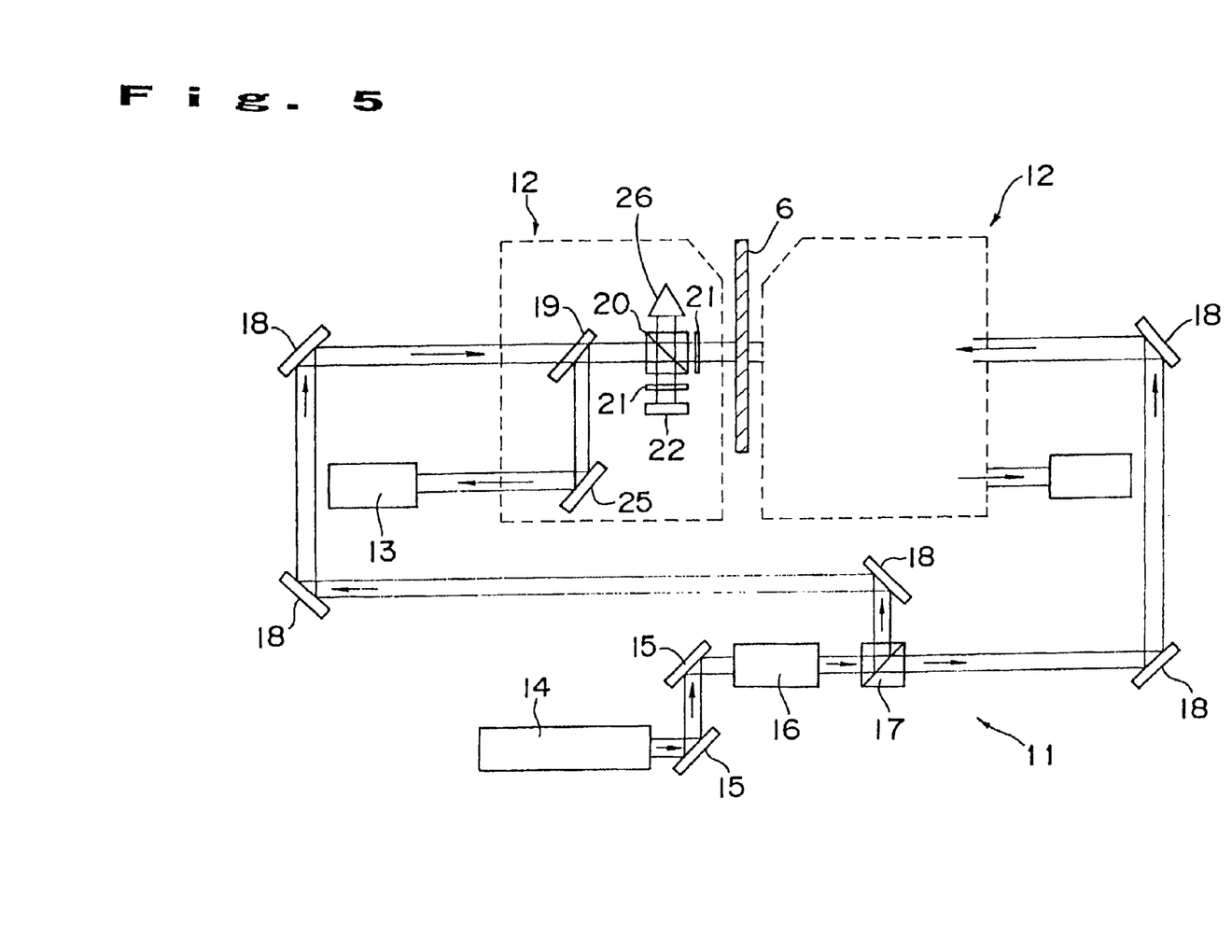
FIG. 5 is a view showing another example of an optical system of the optical probe.

FIG. 5 shows a structure in which a corner cube prism 26 is arranged in place of the lens 23 and the mirror 24 in the optical probe 10 shown in FIG. 2. Since an operation thereof is the same as that of the optical probe 10 in FIG. 2, a description thereof will be omitted.

Figure 6:
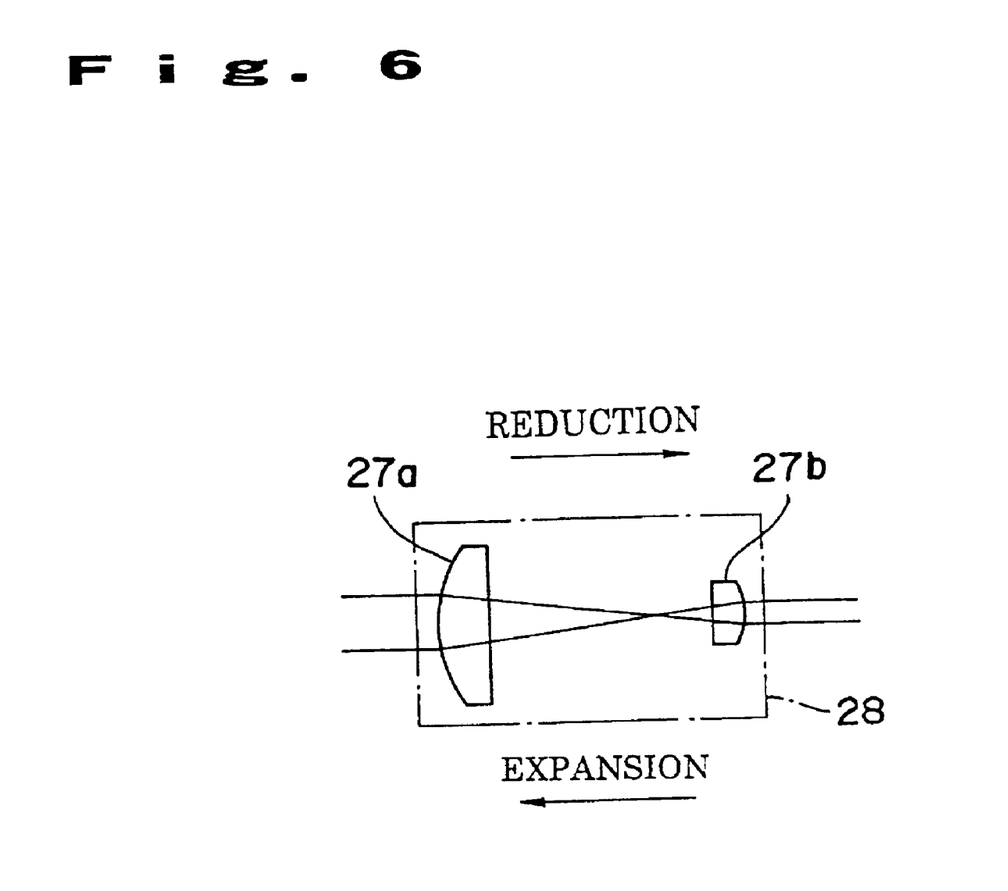
FIG. 6 is a schematic view of a beam expander.

In this case, in the optical probe 10 in FIGS. 2 and 5, since the laser beam is not focused by the lens, the spot diameter thereof is about 1 mm. However, it is possible to expand or reduce the laser beam in a range between 0.5 mm and 2 mm by inserting a beam expander 28 constituted by two lens 27*a* and 27*b* shown in FIG. 6 between the isolator 16 and the beam splitter 17 in the optical probe 10 in FIGS. 2 and 5.

In the embodiments mentioned above, the description is given of the example of the semiconductor wafer made of the silicon for the thin plate, however, the thin plate capable of being measured in the present invention also can employ a structure made of various kinds of materials and shapes. It may be a conductive material or an insulating material. It may be a material which is partly different in a material or an electric property. Further, it may be a laminated body constituted by a plurality of materials. In particular, in addition to the semiconductor wafer made of the silicone or the like in accordance with the embodiments, there can be listed up a metal plate, a ceramic plate and a resin plate which form a material of the magnetic disc. The shape of the thin plate is not limited to a disc shape such as the semiconductor wafer in the embodiment, and may employ the other shapes. In this case, it is preferable that the surface of the thin plate has an excellent property in a light reflecting capability such as a mirror surface or the like.

As is apparent from the description mentioned above, in accordance with the present invention, it is possible to measure the flatness of the thin plate by using the optical probe having the comparatively large spot diameter, and it is possible to measure the whole surface of the thin plate by a reduced scanning.

What is claimed is:

1. An apparatus for measuring a flatness of a thin plate, said apparatus having an optical probe comprising:

a polarization beam splitter separating a laser beam emitted from a laser generator and transmitting through an isolator into a measurement light and a reference light, irradiating the measurement light to a measurement surface of a thin plate and irradiating the reference light to a reference surface arranged perpendicular to said measurement surface;

a quarter wavelength plate arranged between said polarization beam splitter and said measurement surface and through which said measurement light transmits;

a quarter wavelength plate arranged between said polarization beam splitter and said reference surface and through which said reference light transmits;

a focusing and reflected means for focusing and reflected the measurement light reflected by said measurement surface and reflecting by said polarization beam splitter, and the reference light reflecting by said reference surface and transmitting through said polarization beam splitter;

a half mirror reflecting said measurement light and the reference light which return from said polarization beam splitter; and a light receiving portion receiving said measurement light and the reference light which are reflected by the half mirror so as to interfere, converting an interference light intensity change into an electric signal, and counting the electric signal so as to measure a flatness of the measurement surface.

2. The apparatus for measuring a flatness of a thin plate as claimed in claim 1, wherein said focusing and reflecting means is constituted by a focusing lens focusing said measurement light and the reference light and a mirror arranged at the focusing position.

3. The apparatus for measuring a flatness of a thin plate as claimed in claim 1, wherein said focusing and reflecting means can be constituted by a corner cube prism reflecting said measurement light and the reference light.

4. The apparatus for measuring a flatness of a thin plate as claimed in claim 1, wherein a beam expander is arranged in the emitting light path of said laser generator.

5. The apparatus for measuring a flatness of a thin plate as claimed on claim 1, wherein said optical probe is arranged in both sides of the thin plate in an opposing manner, and a measuring means for adding the measurement data concerning these flatness so as to measure a thickness variation of the thin plate is provided.

6. A method for measuring a flatness of a thin plate comprising:

separating a laser beam into a measurement light and a reference light by a polarization beam splitter;

irradiating said measurement light to a measurement surface of a thin plate via a first quarter wavelength plate;

irradiating said reference light to a reference surface arranged perpendicular to said measurement surface via a second quarter wavelength plate;

focusing and reflecting the measurement light reflected by said measurement surface, transmitting through said quarter wavelength plate and reflected by said polarization beam splitter, and the reference light reflected by said reference surface, transmitting through said quarter wavelength plate and transmitting through said polarization beam splitter;

again separating said measurement light and said reference light which focus and reflect, by said polarization beam splitter, and irradiating said measurement light and said reference light respectively on said measurement surface and said reference surface via said first and second quarter wavelength plates;

reflecting the measurement light which again reflects by said measurement surface, transmits through said quarter wavelength plate and transmits through said polarization beam splitter, and the reference light which again reflects by said reference surface, transmits through said quarter wavelength plate and reflects by said polarization beam splitter, by a half mirror; and receiving said measurement light and the reference light which are reflected by said half mirror so as to interfere, converting an interference light intensity change into an electric signal, and counting the electric signal so as to measure a flatness of the measurement surface.

7. The method of measuring a flatness of a thin plate as claimed in claim 6, wherein said optical probe measuring method is executed on both sides of the thin plate, and these measurement data are added so as to measure the thickness variation of the thin plate.

* * * * *